(12) United States Patent
Sugahara et al.

(10) Patent No.: US 8,144,372 B2
(45) Date of Patent: Mar. 27, 2012

(54) IMAGE SCANNING APPARATUS

(75) Inventors: Hiroto Sugahara, Aichi-ken (JP); Kosuke Nukui, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1012 days.

(21) Appl. No.: 12/050,870

(22) Filed: Mar. 18, 2008

(65) Prior Publication Data

US 2008/0231919 A1    Sep. 25, 2008

(30) Foreign Application Priority Data

Mar. 19, 2007   (JP) .................................. 2007-071035

(51) Int. Cl.
*H04N 1/04*        (2006.01)

(52) U.S. Cl. ........ 358/474; 358/498; 358/501; 399/364; 399/371

(58) Field of Classification Search .................. 358/474, 358/488, 496, 475, 505, 501, 498, 497; 355/25, 355/82, 75; 399/364, 367, 371
See application file for complete search history.

(56) References Cited

U.S. PATENT DOCUMENTS

| | | | | | |
|---|---|---|---|---|---|
| 4,951,518 | A | * | 8/1990 | Hendershot | 74/395 |
| 5,526,098 | A | * | 6/1996 | Peck et al. | 399/362 |
| 5,835,201 | A | * | 11/1998 | Itano et al. | 355/75 |
| 6,195,152 | B1 | * | 2/2001 | Hyman | 355/25 |
| 6,325,288 | B1 | * | 12/2001 | Spitz | 235/462.12 |
| 6,459,510 | B1 | * | 10/2002 | Brewer et al. | 358/497 |
| 6,559,977 | B2 | * | 5/2003 | Sasai et al. | 358/400 |
| 7,778,572 | B2 | * | 8/2010 | Iijima | 399/125 |
| 7,800,788 | B2 | * | 9/2010 | Yazawa et al. | 358/474 |
| 8,040,576 | B2 | * | 10/2011 | Ohira et al. | 358/474 |
| 2006/0215236 | A1 | * | 9/2006 | Itoi | 358/474 |

FOREIGN PATENT DOCUMENTS

| | | |
|---|---|---|
| JP | H10-020416 A | 1/1998 |
| JP | 2000-321683 A | 11/2000 |
| JP | 2006-078516 A | 3/2006 |

* cited by examiner

*Primary Examiner* — Negussie Worku

(74) *Attorney, Agent, or Firm* — Baker Botts L.L.P.

(57) ABSTRACT

An image scanning apparatus comprises a platen surface which is provided at an upper part of a main body of the image scanning apparatus so that an original sheet to be scanned is placed thereon; and an original sheet support portion which is provided to support an original sheet having a larger size than the platen surface. The original sheet support portion is provided to protrude laterally from the main body in a position under the platen surface to be able to support an end portion of a protruding portion of the original sheet protruding outside from the platen surface.

8 Claims, 11 Drawing Sheets

IMAGE SCANNING APPARATUS

CROSS-REFERENCE TO RELATED APPLICATION

This application claims the benefit of Japanese Patent Application No. 2007-071035, Mar. 19, 2007, the disclosure of which is incorporated herein by reference.

TECHNICAL FIELD

The present invention relates to an image scanning apparatus which is configured to scan a original sheet placed on a platen to read an image drawn on the original sheet.

BACKGROUND ART

Examples of an image scanning apparatus capable of scanning an original sheet placed on a platen are a complex printer, a copying machine, a facsimile transmitter, etc. Some of these image scanning apparatuses are provided with an original sheet cover to which a white film is bonded to prevent a surrounding region of an original sheet having a smaller area than a platen from being printed in black color, when scanning the original sheet to print an image on a recording medium such as a sheet of recording paper. The original sheet cover serves to support the original sheet to be scanned.

An area of the original sheet capable of being scanned in one scanning process is limited. In some cases, it is necessary to scan a part of the original sheet having a larger area. In these cases, a part of the original sheet placed on the platen protrudes from the platen and hangs therefrom. The original sheet is likely to be displaced from a correct position because of weight of the protruding portion hanging from the platen. To avoid this, an operator closes the original sheet cover and holds the original sheet while pressing the original sheet with a hand. The operator must release the hand from the original sheet before the original sheet cover has been completely closed. Still, the original sheet is likely to be displaced from the correct position.

Accordingly, Japanese Laid-Open Patent Application Publications Nos. 2006-78516 and 2000-321683 disclose image scanning apparatuses configured to scan a part of an original sheet having a relatively large area while maintaining the original sheet in a correct position. In these image scanning apparatuses, a support portion which is substantially coplanar with a platen is provided to support a surface of a protruding portion of the original sheet placed on the platen. This eliminates a need for the operator to press the original sheet with a hand when closing an original sheet cover, suppressing displacement of the original sheet.

Because of limited installation areas or transportability associated with changing of interiors, it is demanded that image scanning apparatuses such as complex printers commonly used at home and the like or copying machines and facsimile transmitters widely available at offices have a smaller size. In the image scanning apparatuses disclosed in the above Publications, since the support portion supports the surface of the protruding portion of the original sheet, it is necessary to protrude the support portion with a large amount horizontally from a main body of the apparatus such that the support portion is made substantially coplanar with the platen. In addition, the whole original sheet supported by the support portion, including the protruding portion is caused to have a horizontal posture. This increases the size of the apparatus including the support portion, and therefore makes it difficult to meet the above demand.

SUMMARY OF THE INVENTION

The present invention has been made under the circumstances, and an object of the present invention is to provide an image scanning apparatus which is capable of supporting a protruding portion of an original sheet having a relatively large area which protrudes from a platen on which the original sheet is placed, to prevent displacement of the original sheet when scanning the original sheet, and of suppressing an increase in a size of the image scanning apparatus.

According to the present invention, there is provided an image scanning apparatus comprising a platen surface which is provided at an upper part of a main body of the image scanning apparatus so that an original sheet to be scanned is placed thereon; and an original sheet support portion which is provided to support an original sheet having a larger size than the platen surface; wherein the original sheet support portion is provided to protrude laterally from the main body in a position under the platen surface to be able to support an end portion of a protruding portion of the original sheet protruding outside from the platen surface.

In such a configuration, the protruding portion of the original sheet hangs outside from the platen surface, and an end portion or an edge portion of the hanging protruding portion is supported by the original sheet support portion. Therefore, the protruding portion of the original sheet can be supported by the original sheet support portion. In addition, a protruding dimension of the original sheet support portion protruding laterally from the main body of the image scanning apparatus can be reduced, and as a result, a size of the entire image scanning apparatus is not increased.

The main body may have, on a side surface thereof located below the platen surface, an opening of at least one of a paper supply inlet from which a recording sheet on which a scanned image is to be recorded is supplied to inside the main body and a paper discharge outlet from which the recording sheet having the scanned image recorded is discharged to outside the main body. The original sheet support portion may protrude from a region in the vicinity of a lower end of the opening. In such a configuration, when the original sheet support portion is protruded in the vicinity of the paper supply inlet, it is able to support sheets of recording paper accommodated within the paper supply inlet before the sheets are supplied to inside the main body of the image scanning apparatus. Thus, the original sheet support portion serves as the paper supply tray. On the other hand, when the original sheet support portion is protruded in the vicinity of the paper discharge outlet, it is able to support the sheets of recording paper which have been discharged after printing and are accommodated within the paper discharge outlet. Thus, the original sheet support portion serves as the paper discharge tray.

The original sheet support portion may be movable between a state where the original sheet support portion protrudes from the region in the vicinity of the lower end of the opening to open the opening and a state where the original sheet support portion closes the opening. In such a configuration, when the image scanning apparatus is not operated, the opening is closed to prevent entry of dust and foreign matters into the main body through the opening. Furthermore, when the image scanning apparatus is capable of operating as an ink jet printer, drying of the ink within nozzle holes formed in the ejecting head can be suppressed.

The original sheet support portion may have an insertion portion into which an end portion of the protruding portion of the original sheet is inserted. The insertion portion may have a pair of support portions extending substantially vertically to face an obverse surface and a reverse surface of the original sheet. In such a configuration, the end portion of the protruding portion inserted into the insertion portion is less likely to be displaced forward and rearward. As a result, the end portion can be supported reliably.

The insertion portion may be a part of a plurality of insertion portions arranged to extend in a direction perpendicular to a direction in which the end portion of the protruding portion extends. In such a configuration, since the end portion of the protruding portion of the original sheet can be retained by the insertion portion in a suitable position according to the size of the original sheet. Thus, the original sheet can be supported appropriately irrespective of the size of the original sheet.

The pair of support portions may be located closer to and distant from the opening, respectively, and the support portion located closer to the opening is inclined with respect to a vertical direction with a larger angle than the support portion located distant from the opening. The pair of support portions may be shaped such that a distance between the pair of support portions may increases as the support portions extend upward. For example, when the original sheet support portion is positioned in the vicinity of the lower end of the paper supply inlet, it is able to support the end portion of the protruding portion of the original sheet with the above configuration, and the end portion of the recording sheet is less likely to engage with the support portion when the recording sheet is inserted into the paper supply inlet.

In the upper part of the main body, an upper surface of a surrounding region which surrounds the platen surface and is located closer to the original sheet support portion, may be formed to be flat and substantially coplanar with the platen surface. In such a configuration, the original sheet placed on the platen surface can maintain its straight posture from the platen surface to the surrounding region located closer to the original sheet support portion. This makes it possible to easily close the original sheet cover and correctly scan the original sheet.

The image scanning apparatus may further comprise an operation section which is provided at a surrounding region surrounding the platen surface other than the surrounding region located closer to the original sheet support portion, and is operated by an operator. This makes it possible to avoid that the original sheet is overlaid on the operation section typically including a plurality of convex-shaped button switches, maintaining the original sheet placed on the platen surface in a straight posture.

The above and further objects and features of the invention will more fully be apparent from the following detailed description with accompanying drawings.

DETAILED DESCRIPTION OF THE EMBODIMENTS

Hereinafter, an embodiment of an image scanning apparatus of the present invention will be described with reference to the drawings.

Figure 1:
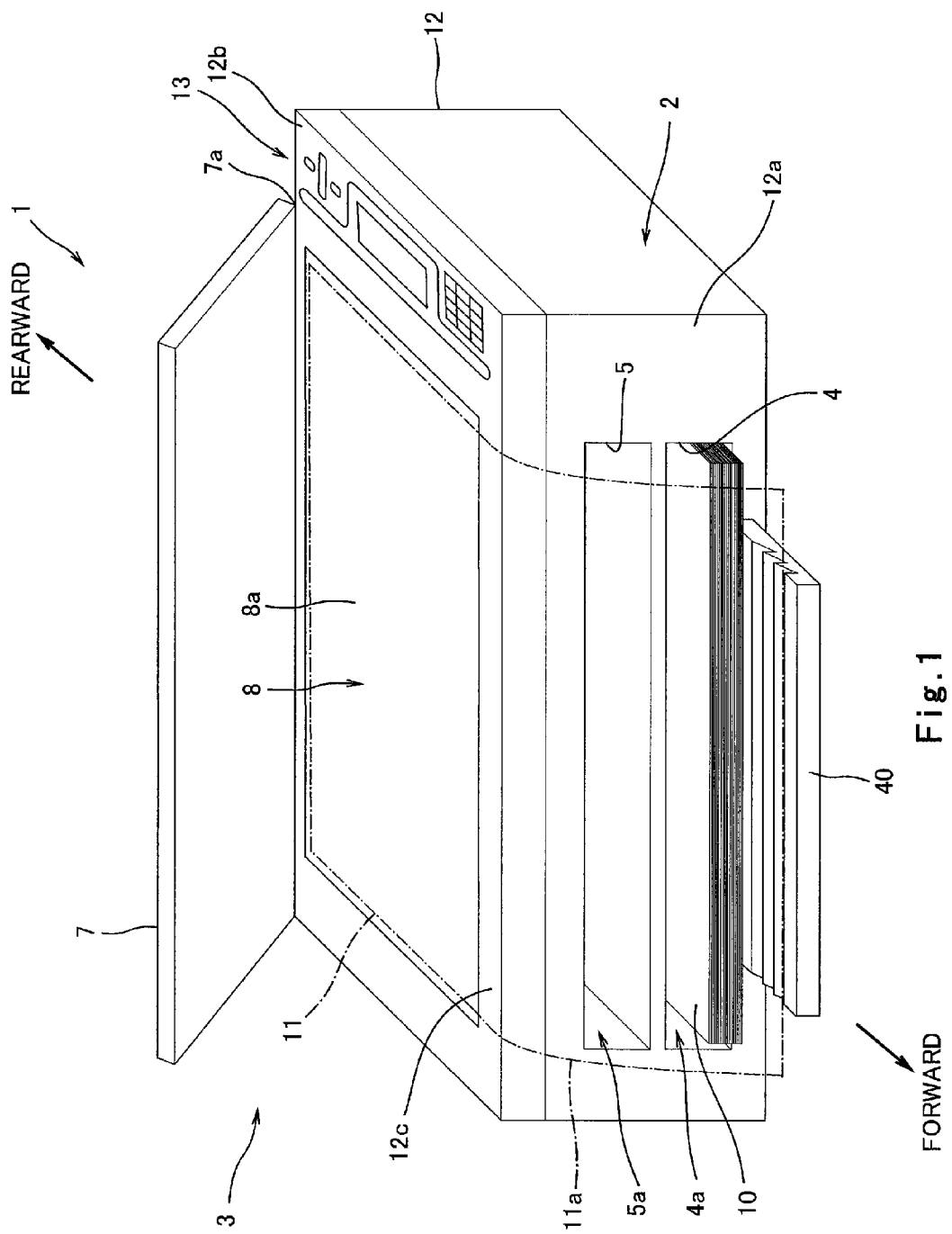
FIG. 1 is a perspective view showing an external configuration of an image scanning apparatus according to an embodiment of the present invention.
Figure 2:
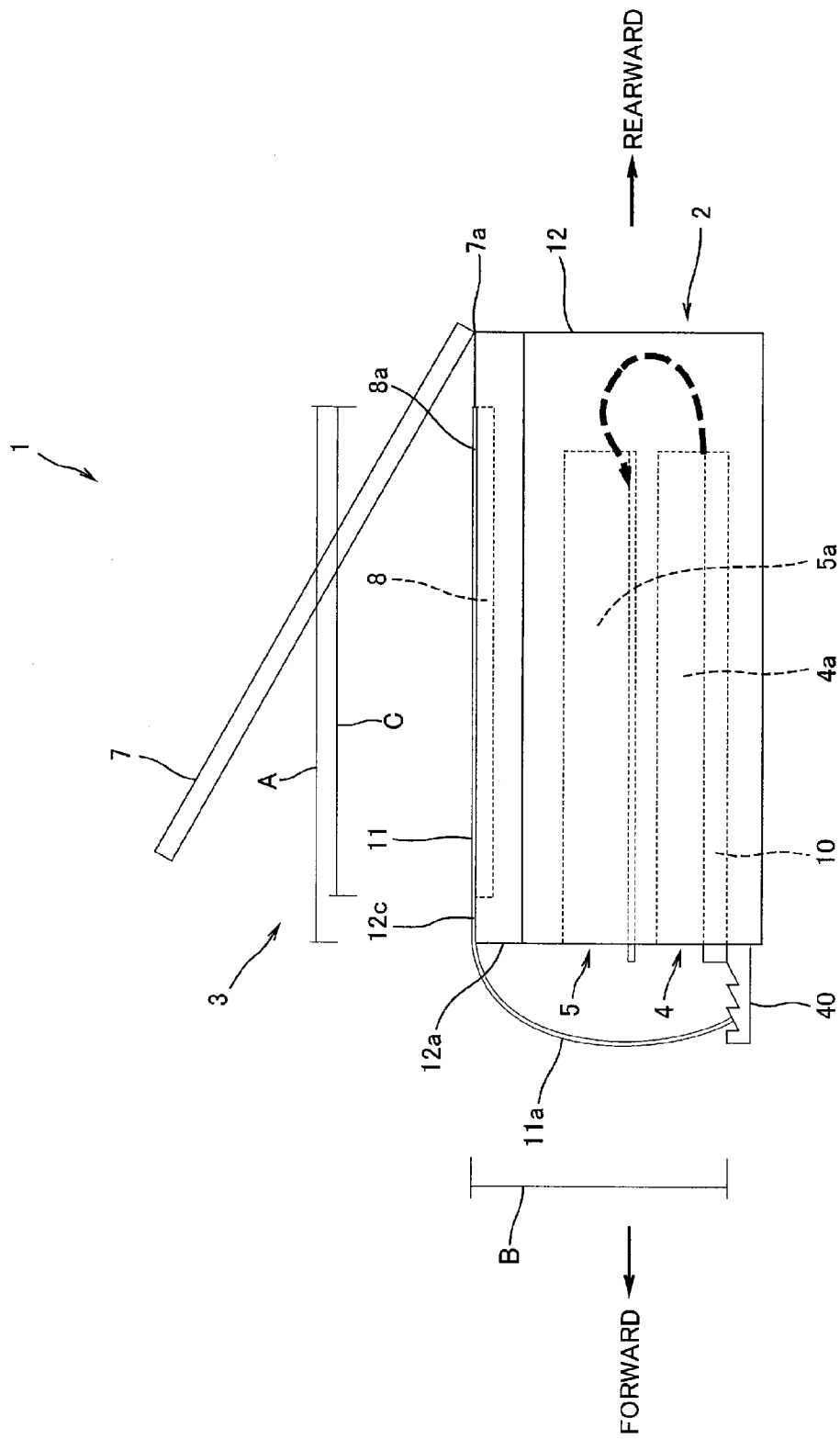
FIG. 2 is a side view showing the configuration of the image scanning apparatus of FIG. 1.

FIG. 1 is a perspective view showing an external configuration of an image scanning apparatus 1 according to the embodiment of the present invention. In this embodiment, a complex machine is illustrated as the image scanning apparatus 1. FIG. 2 is a side view of the image scanning apparatus 1 of FIG. 1. As shown in FIG. 1, the image scanning apparatus 1 is a multi-function apparatus including a printer section 2 for recording an image by an ink jet method at a lower part of a casing (main body) 12 of a substantially rectangular parallelepiped shape, and a scanner section 3 at an upper part of the casing 12. The image scanning apparatus 1 is capable of printing, scanning, copying, and facsimile transmission.

As shown in FIGS. 1 and 2, the image scanning apparatus 1 has, at a lower part of a front wall portion 12a of the casing 12, a paper supply inlet 4 from which recording paper 10 on which an image is to be recorded is supplied, and above the paper supply inlet 4, a paper discharge outlet 5 from which the recording paper 10 on which the image has been recorded in the printer section 2 is discharged. A paper supply tray 4a is provided within the paper supply inlet 4. In this embodiment, the paper supply tray 4a is configured to be able to accommodate plural sheets of the recording paper 10 of various sizes of A3 size or smaller. A paper discharge tray 5a is provided within the paper discharge outlet 5 and is configured to be able to accommodate plural sheets of the recording paper 10 on which the image has been recorded.

The scanner section 3 provided at the upper part of the image scanning apparatus 1 is formed by a flat bed scanner. To be specific, an original sheet cover 7 having a substantially rectangular shape is disposed on an upper surface of the image scanning apparatus 1 as a top plate of the image scanning apparatus 1. The original sheet cover 7 is supported at a rear end portion thereof by a pivot axis 7a provided at a rear portion of the upper surface of the casing 12 to extend rightward and leftward. The original sheet cover 7 is pivotable around the pivot axis 7a to be opened and closed. A platen glass 8 is provided at a region of the upper surface of the casing 12 which is covered with the original sheet cover 7. An upper surface of the platen glass 8 forms a platen surface 8a on which original sheet 11 is placed. In addition, an image sensor 9 (see FIG. 3) and the like are provided within the casing 12 and below the platen glass 8 to read an image of the original sheet 11 placed on the platen surface 8a.

An operation panel 13 is provided at a right part 12b of the upper surface of the casing 12 to enable the operator to operate the printer section 2 or the scanner section 3. To be specific, the original sheet cover 7 has a smaller area than the upper surface of the casing 12, and therefore, there is a region in the right part 12b of the casing 12 which is not covered with the original sheet cover 7 in a state where the original sheet cover 7 is closed. The operation panel 13 is disposed at this region. The operation panel 13 includes operation buttons, liquid crystal displays, and others. The image scanning apparatus 1 is operable based on a command sent from the operation panel 13 which has been operated by the operator. A front portion 12c of the upper surface of the casing 12, i.e., a front portion (support portion side surrounding region) which is included in a surrounding region surrounding the platen surface 8a on the upper surface of the casing 12 and is closer to an original sheet support portion 40 to be described later, is flat and substantially coplanar with the platen surface 8a.

Figure 3:
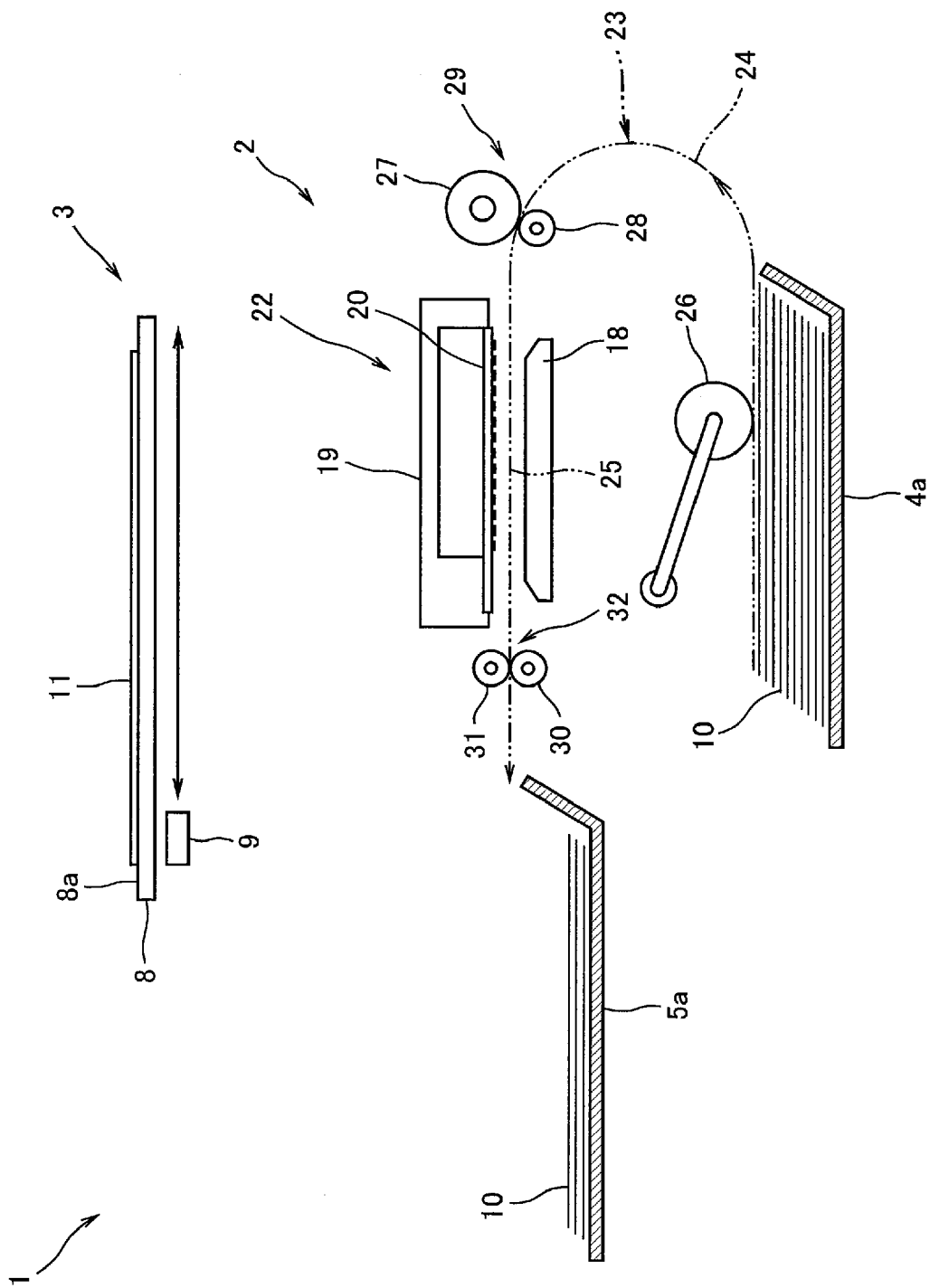
FIG. 3 is a schematic cross-sectional view showing the configuration of the image scanning apparatus of FIG. 1.

FIG. 3 is a schematic cross-sectional view showing the configuration of the image scanning apparatus 1 of FIG. 1. As shown in FIG. 2, the paper supply tray 4a is provided in the vicinity of a bottom portion of the image scanning apparatus 1, and a flat plate-shaped platen 18 which is elongated rightward and leftward is provided above the paper supply tray 4a. Above the platen 18, an image recording unit 22 in which an ejecting head 20 for ejecting ink from nozzle holes and other components are mounted to a carriage 19, is provided. A paper feed path 23 extends from a rear part of the paper supply tray 4a. The paper feed path 23 includes a curved path 24 curved to extend from the rear part of the paper supply tray 4a upward and then forward, and a straight path 25 extending forward from a terminal point of the curved path 24. The paper feed path 23 is formed by an outer guide surface and an inner guide surface which are opposite to each other to be spaced apart a predetermined distance from each other, in a region except where the image recording unit 22 is provided.

A paper supply roller 26 is provided immediately above the paper supply tray 4a to supply the recording paper 10 within the paper supply tray 4a to the paper feed path 23. In the vicinity of a region of the paper feed path 23 which is located downstream of the curved path 24 in a flow of the sheet of the recording paper 10, a pair of feed rollers 29 consisting of a feed roller 27 and a pinch roller 28 are provided in such a manner that the rollers 27 and 28 sandwich the paper feed path 23 from above and from below. In the vicinity of a region of the paper feed path 23 which is located downstream of the straight path 25 in the flow of the sheet of the recording paper 10, a pair of paper discharge rollers 32 consisting of a paper discharge roller 30 and a pinch roller 31 are provided in such a manner that the rollers 30 and 31 sandwich the paper feed path 23 from above and from below. The ejecting head 20 and the platen 18 sandwich the straight path 25 from above and from below between the pair of feed rollers 29 and the pair of paper discharge rollers 32.

The sheet of the recording paper 10 within the paper supply tray 4a is supplied to the paper feed path 23 by the paper supply roller 26 and then are guided from the curved path 24 to the straight path 25 on the paper feed path 23 by the pair of feed rollers 29. On the straight path 25, the sheet of the recording paper 10 is applied with the ink ejected from the ejecting head 20 placed opposite to the sheet so that an image is recorded thereon. After completion of recording, the sheet of the recording paper 10 is discharged along the straight path 25 by the pair of paper discharge rollers 32, and is accommodated into the paper discharge tray 5a.

The scanner section 3 is provided above the printer section 2. As shown in FIG. 3, the image sensor 9 is disposed under the platen glass 8 to be able to reciprocate between one end of the platen glass 8 and an opposite end of the platen glass 8. The image sensor 9 reads the image of original sheet 11 placed on the platen surface 8a of the platen glass 8, and outputs read image data to a control unit (not shown) including a CPU and others. The control unit drives the ejecting head 20 based on the image data to cause the image to be recorded on the sheet of the recording paper 10. Thus, the image of the original sheet 11 is copied onto the sheet of the recording paper 10.

In the image scanning apparatus 1 of this embodiment, to scan an image from a part of the original sheet 11 having a larger size than the platen surface 8a in the state where the original sheet 11 is placed on the platen surface 8a, the original sheet support portion 40 is provided to support a protruding portion 11a of the original sheet 11 which protrudes outside from the platen surface 8a. Hereinafter, several examples of a structure of the original sheet support portion 40 will be described.

EXAMPLE 1

Figure 4:
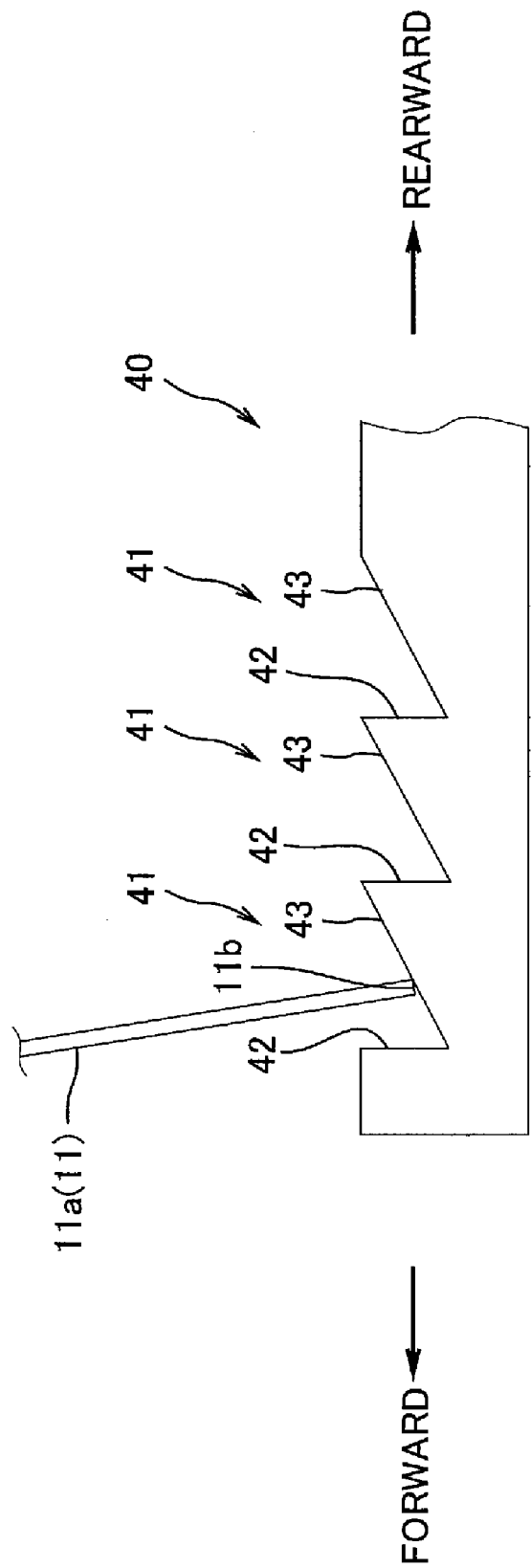
FIG. 4 is an enlarged side view showing a structure of an original sheet support portion according to an example 1.

As shown in FIGS. 1 and 2, the original sheet support portion 40 of a rectangular plate shape is provided at a lower part of the front wall portion 12a of the image scanning apparatus 1 and protrudes forward from a region in the vicinity of a lower end of the paper supply inlet 4. FIG. 4 is an enlarged side view of the original sheet support portion 40 according to an example 1. As shown in FIG. 4, a plurality of insertion grooves 41 are provided on an upper portion of the original sheet support portion 40 so that an end portion 11b of the protruding portion 11a of the original sheet 11 is inserted thereinto. The insertion grooves 41 are wedge-shaped grooves extending rightward and leftward. In this embodiment, three insertion grooves 41 are arranged forward and rearward.

Each insertion groove 41 is formed by a pair of a front support wall 42 and a rear support wall 43 located forward and rearward, respectively. The rear support wall 43 located closer to the paper supply inlet 4 (see FIG. 2) is inclined with a larger angle with respect to a vertical direction than the front support wall 42 located distant from the paper supply inlet 4. To be specific, in this example, the front support wall 42 has a substantially vertical surface and the rear support wall 43 has a surface inclined about 60 degrees with respect to the vertical direction. In a side view, the insertion groove 41 is shaped to open upward such that a horizontal distance between the support walls 42 and 43 increases upward.

In the image scanning apparatus 1 comprising the original sheet support portion 40 according to the example 1, when the original sheet 11 having a larger size than the platen surface 8a is placed on the platen surface 8a in such a way that the protruding portion 11a protruding outside from the platen surface 8a is made to hang in front of the casing 12 as shown FIGS. 1 and 2, the end portion 11b (see FIG. 4) of the protruding portion 11a is inserted into the insertion groove 41 and supported there in a state where the front support wall 42 and the rear support wall 43 of the insertion groove 41 are respectively substantially opposite to one surface and the other surface of the protruding portion 11a. This makes it possible to prevent the original sheet 11 from being displaced from the correct position and falling off without a need for an operator to press the original sheet 11 with a hand. As a result, the original sheet cover 7 can be easily closed while correctly positioning the original sheet 11 on the platen surface 8a.

As used herein, the end portion 11b of the original sheet 11 which is supported by the insertion groove 41 of the original sheet support portion 40 means, to be precise, an end surface portion or an edge portion connecting one surface of the original sheet 11 on which the image is formed and the other surface which is the opposite surface. To be substantial, the end portion 11b means a contact portion in contact with the support wall 42 or 43 in a direction crossing the support wall 42 or 43 in a state where the protruding portion 11a of the original sheet 11 is inserted into the insertion groove 41.

The plurality of insertion grooves 41 are arranged forward and rearward, i.e., in a direction perpendicular to a direction in which the protruding portion 11a extends, and any of them is able to support the end portion 11b of the protruding portion 11a of the original sheet 11. Therefore, irrespective of the size of the original sheet 11 or how the operator places the original sheet 11 on the platen surface 8a, the end portion 11b of the protruding portion 11a can be supported appropriately.

Since the pair of support walls 42 and 43 are inclined in the manner described above, the sheet of the recording paper 10 is less likely to engage with the insertion groove 41 when inserting the sheet of the recording paper 10 from the paper supply inlet 4 into the paper supply tray 4a. To be specific, as shown in FIG. 4, the rear support wall 43 located closer to the paper supply inlet 4 is inclined obliquely upward in the rearward direction as it is closer to the paper supply inlet 4. With this structure, a tip end portion of the sheet of the recording paper 10 inserted into the paper supply tray 4a is guided obliquely upward in the rearward direction along the surface of the rear support wall 43 toward the paper supply inlet 4 if the tip end portion of the sheet of the recording paper 10 contacts the rear support wall 43. Therefore, the sheet is less likely to engage with the insertion groove 41 and can be inserted smoothly into the paper supply tray 4a.

The original sheet support portion 40 is plate-shaped and protrudes from the region in the vicinity of the lower end of the paper supply inlet 4. Therefore, even in cases where recording paper 10 having a larger size than the paper supply tray 4a, for example, recording paper of A3 size in a plan view, is put into the paper supply tray 4a of A4 size in a plan view, the original sheet support portion 40 is able to support a protruding portion of the recording paper 10 protruding outside the paper supply tray 4a. In other words, the original sheet support portion 40 forms a part of the paper supply tray 4a, and thus the paper supply tray 4a and the original sheet support portion 40 form a paper supply tray for recording paper having a larger size.

As shown in FIG. 2, the position of the original sheet support portion 40 is desirably determined such that, when a dimension from a rear end of the platen surface 8a to a front end of the upper surface of the casing 12 in a side view is A, a vertical dimension from a front end of the platen surface 8a to the original sheet support portion 40 is B, and a front-rear dimension of the platen surface 8a is C, (A+B)<2C. The same applies to the following examples. In this case, for example, when the original sheet 11 of A3 size is placed on the platen surface 8a having a size equal to that of the paper of A4 size, the end portion 11b of the protruding portion 11a can be supported on the original sheet support portion 40.

EXAMPLE 2

Figure 5:
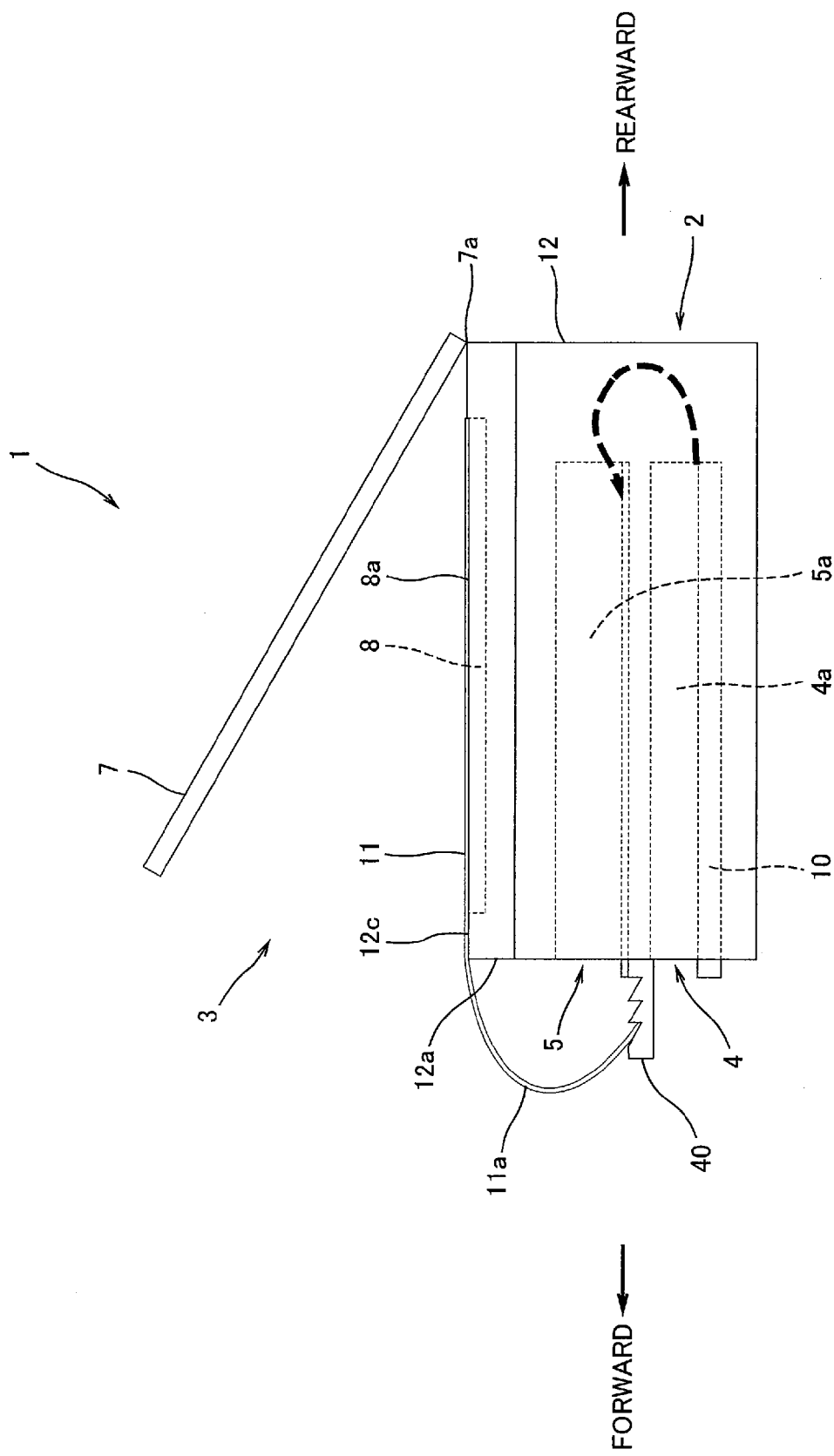
FIG. 5 is a side view showing a configuration of an image scanning apparatus equipped with an original sheet support portion according to an example 2.
Figure 6:
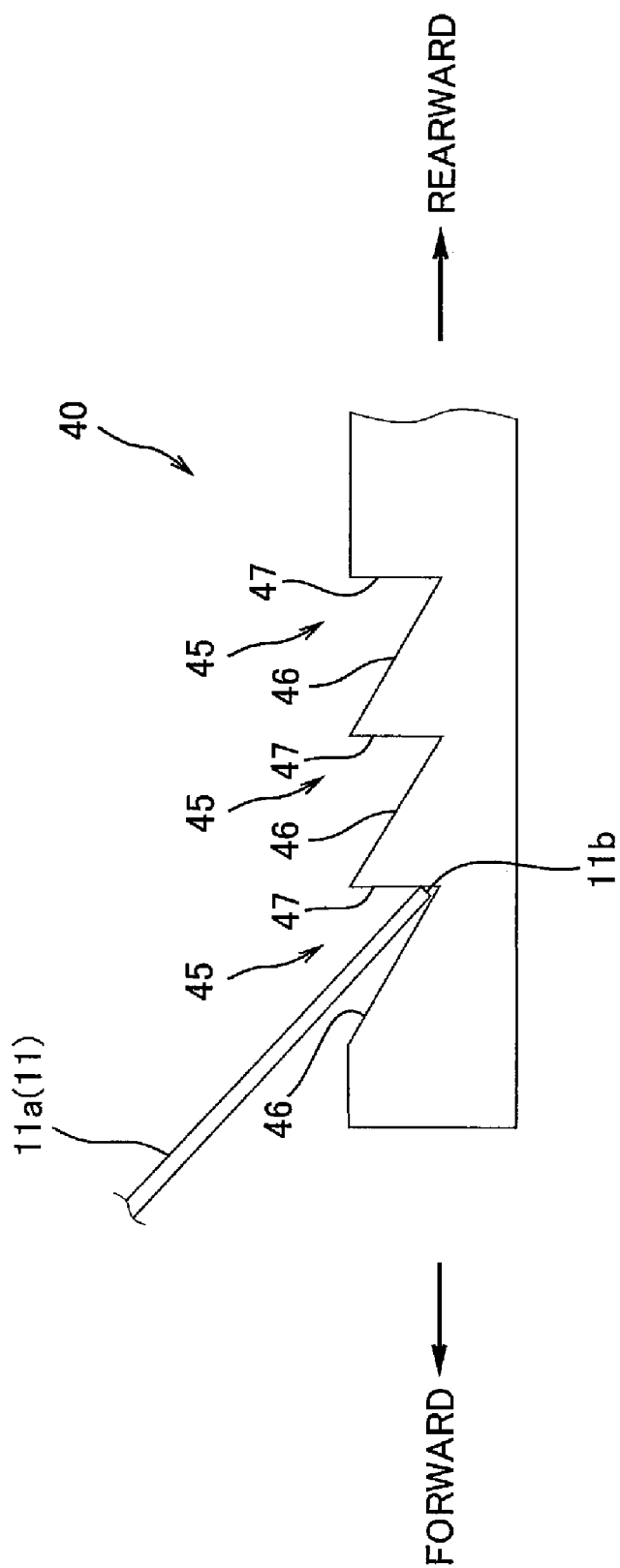
FIG. 6 is an enlarged side view showing a structure of the original sheet support portion according to the example 2.

FIG. 5 is a side view showing a configuration of the image scanning apparatus 1 comprising the original sheet support portion 40 according to an example 2. FIG. 6 is an enlarged side view showing a structure of the original sheet support portion 40. As shown in FIG. 5, in the image scanning apparatus 1 according to the example 2, the original sheet support portion 40 of a rectangular-plate shape protrudes forward from a region of the front wall portion 12a between the paper supply inlet 4 and the paper discharge outlet 5. As shown in FIG. 6, a plurality of insertion grooves 45 are provided on an upper part of the original sheet support portion 40 so that the end portion 11b of the protruding portion 11a of the original sheet 11 is inserted thereinto. The insertion grooves 45 are wedge-shaped grooves extending rightward and leftward. In this embodiment, three insertion grooves 41 are arranged forward and rearward.

Each insertion groove 45 is formed by a pair of a front support wall 46 and a rear support wall 47 provided forward and rearward. The front support wall 46 located distant from the paper supply inlet 4 (see FIG. 5) is inclined with a larger angle with respect to a vertical direction than the rear support wall 47 located closer to the paper supply inlet 4. To be specific, in this example, the rear support wall 47 has a substantially vertical surface, while the front support wall 46 has a surface inclined about 60 degrees with respect to the vertical direction. In a side view, the insertion groove 45 is shaped to open upward such that a horizontal distance between the support walls 46 and 47 increases upward. Thus, between the insertion groove 45 of the original sheet support portion 40 of this example and the insertion groove 41 of FIG. 4, the relationship in inclination of the front support wall 46 and the rear support wall 47 is reversed.

In the image scanning apparatus 1 comprising the original sheet support portion 40 according to the example 2, when the original sheet 11 having a larger size than the platen surface 8a is placed on the platen surface 8a such that the protruding portion 11a protruding outside from the platen surface 8a is made to hang in front of the casing 12, the end portion 11b (see FIG. 6) of the protruding portion 11a is inserted into the insertion groove 45 and supported there. This makes it possible to prevent the original sheet 11 from being displaced from the correct position and falling off without a need for the operator to press the original sheet 11 with a hand. As a result, the original sheet cover 7 can be easily closed while correctly positioning the original sheet 11 on the platen surface 8a.

Since the pair of support walls 46 and 47 are inclined as described above, the end portion 11b of the protruding portion 11a of the original sheet 11 can be supported reliably. As shown in FIG. 5, the protruding portion 11a hanging from the platen surface 8a extends forward along the platen surface 8a, is curved downward, and then is curved obliquely downward in the rearward direction to get closer to the paper discharge outlet 5. In contrast, in the case of the insertion groove 45 of the example 2, since the front support wall 46 has the surface extending upward in the forward direction and the rear support wall 47 has the substantially vertical surface, the insertion groove 45 is open obliquely upward in the forward direction in a side view. The insertion groove 45 having such a shape makes it easy to receive the protruding portion 11a extending obliquely downward in the rearward direction. As a result, the end portion 11b of the protruding portion 11a inserted into the insertion groove 45 can be supported reliably.

In FIGS. 5 and 6, the same or corresponding components are denoted by the same reference numerals as those in FIGS. 1 to 4, and will not be further described.

EXAMPLE 3

Figure 7:
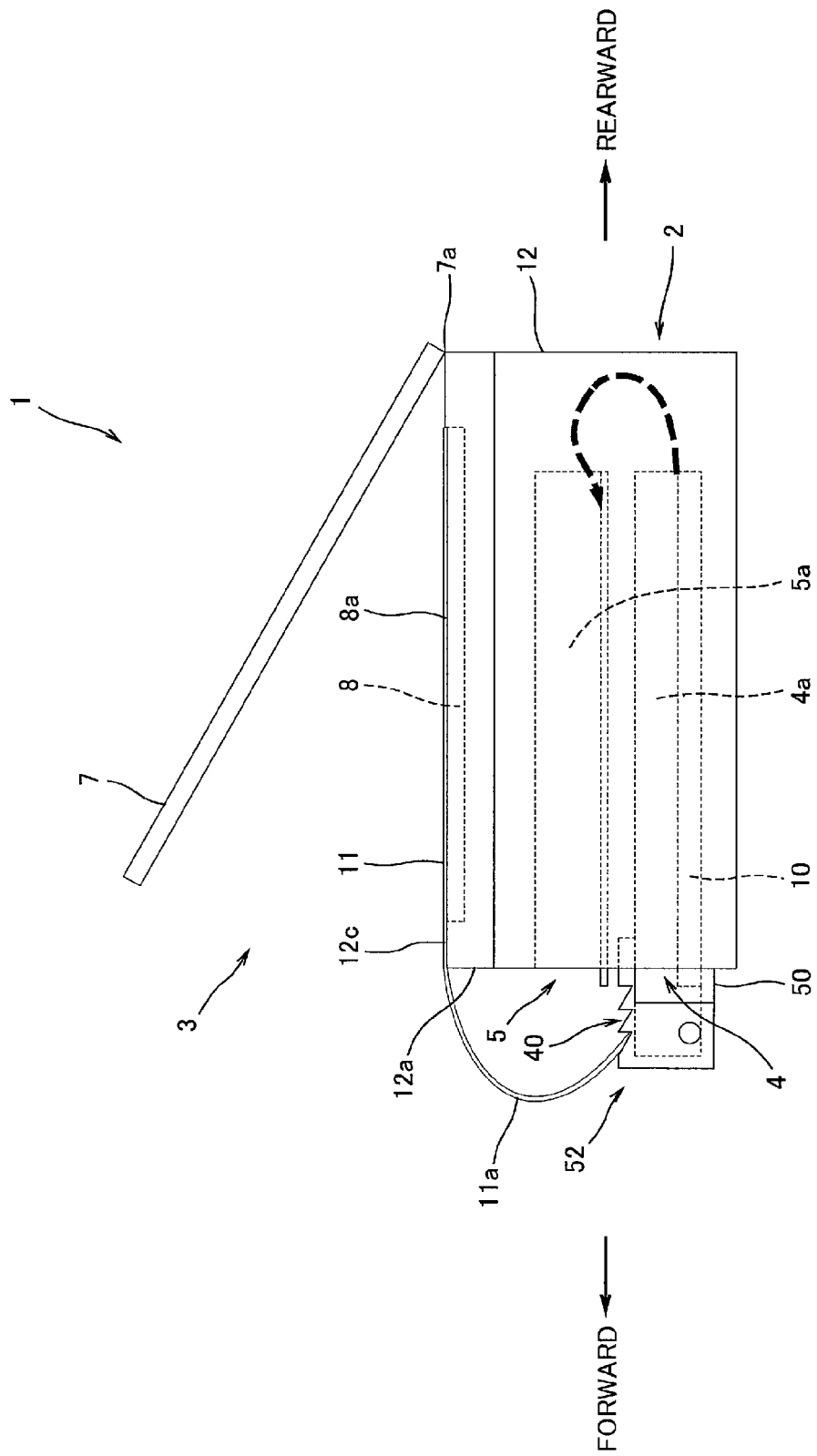
FIG. 7 is a side view showing a configuration of an image scanning apparatus equipped with an original sheet support portion according to an example 3.

FIG. 7 is a side view showing a configuration of the image scanning apparatus 1 comprising the original sheet support portion 40 according to an example 3. As shown in FIG. 7, a paper supply cassette 50 of a box-shape is attached to the paper supply tray 4a of the image scanning apparatus 1, and the original sheet support portion 40 is provided at a portion of the paper supply cassette 50 which protrudes outward from the paper supply inlet 4.

Figure 8:
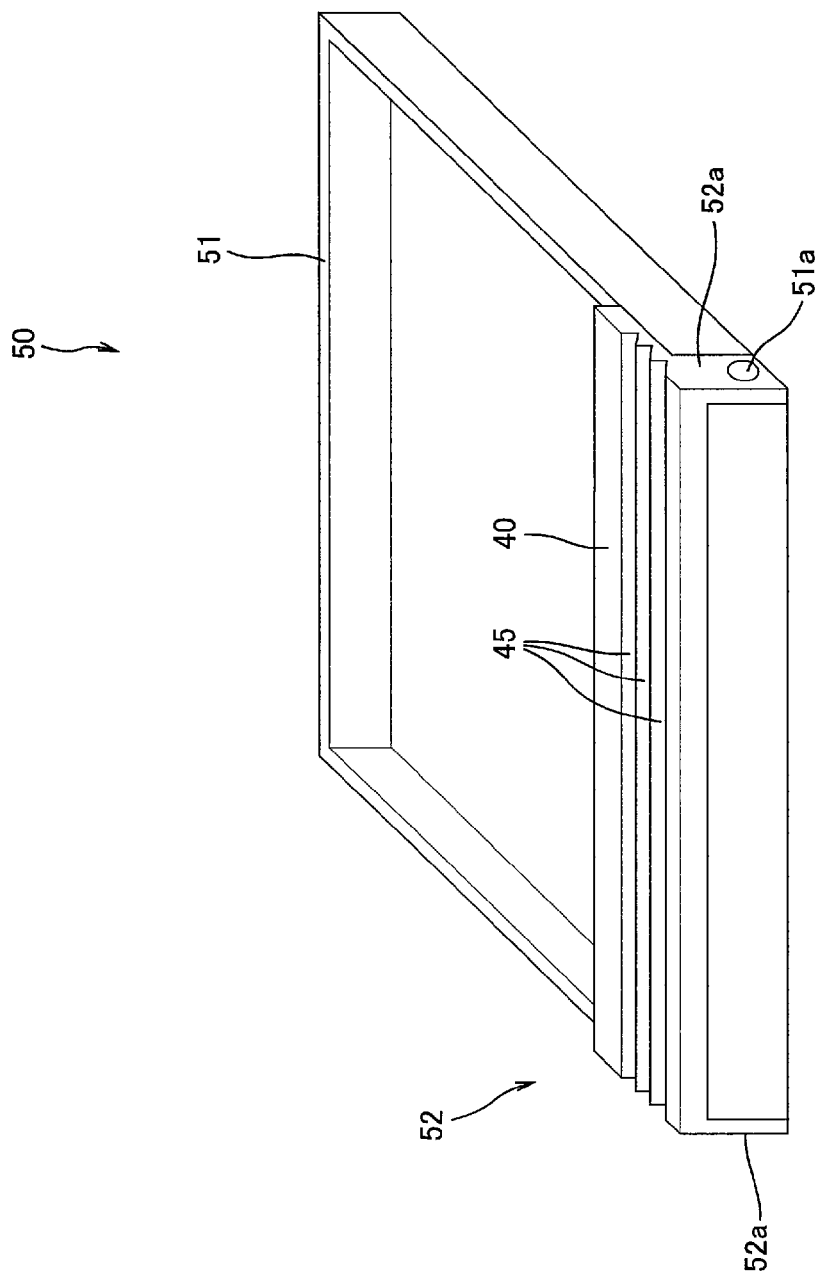
FIG. 8 is a perspective view showing a structure of a paper supply cassette.

FIG. 8 is a perspective view showing a structure of the paper supply cassette 50. As shown in FIG. 8, the paper supply cassette 50 includes a paper accommodating portion 51 which has a rectangular flat box shape and has an open upper part, and a cover portion 52 provided at a front portion of the paper accommodating portion 51 to cover a front portion of an opening of the paper accommodating portion 51. The cover portion 52 has the original sheet support portion 40 which has a rectangular shape elongated rightward and leftward and is provided with the insertion grooves 45 having the same structure as that of FIG. 5 and a flange portion 52a extending downward from both ends of the original sheet support portion 40. A pivot 51a protrudes outward from side surfaces of a front portion of the paper accommodating portion 51. The cover portion 52 is mounted to a lower end portion of the flange portion 52a so as to be rotatable around the pivot 51a.

The cover portion 52 is rotatable around the pivot 51a so as to open and close the front portion of the opening of the paper accommodating portion 51. In a state where the cover portion 52 is positioned to cover the front portion of the opening of the paper accommodating portion 51, the original sheet support portion 40 is positioned such that the insertion grooves 45 are open upward as in the structure shown in FIG. 6. As shown in FIG. 7, when the paper supply cassette 50 is attached to the paper supply tray 4a, the cover portion 52 protrudes forward from the paper supply inlet 4, and the original sheet support portion 40 protrudes forward from a region in the vicinity of an upper end of the paper supply inlet 4.

In the image scanning apparatus 1 comprising the original sheet support portion 40 according to the example 3, when the original sheet 11 having a larger size than the platen surface 8a is placed on the platen surface 8a, the end portion 11b of the protruding portion 11a can be supported by the original sheet support portion 40. This makes it possible to prevent the original sheet 11 from being displaced from the correct position and falling off without a need for the operator to press the original sheet 11 with a hand. As a result, the original sheet cover 7 can be easily closed while correctly positioning the original sheet 11 on the platen surface 8a. In addition, for the same reason described in the example 2, the end portion 11b of the protruding portion 11a of the original sheet 11 can be supported reliably.

In FIGS. 7 and 8, the same or corresponding components are denoted by the same reference numerals as those in FIGS. 1 to 6, and will not be further described.

EXAMPLE 4

Figure 9:
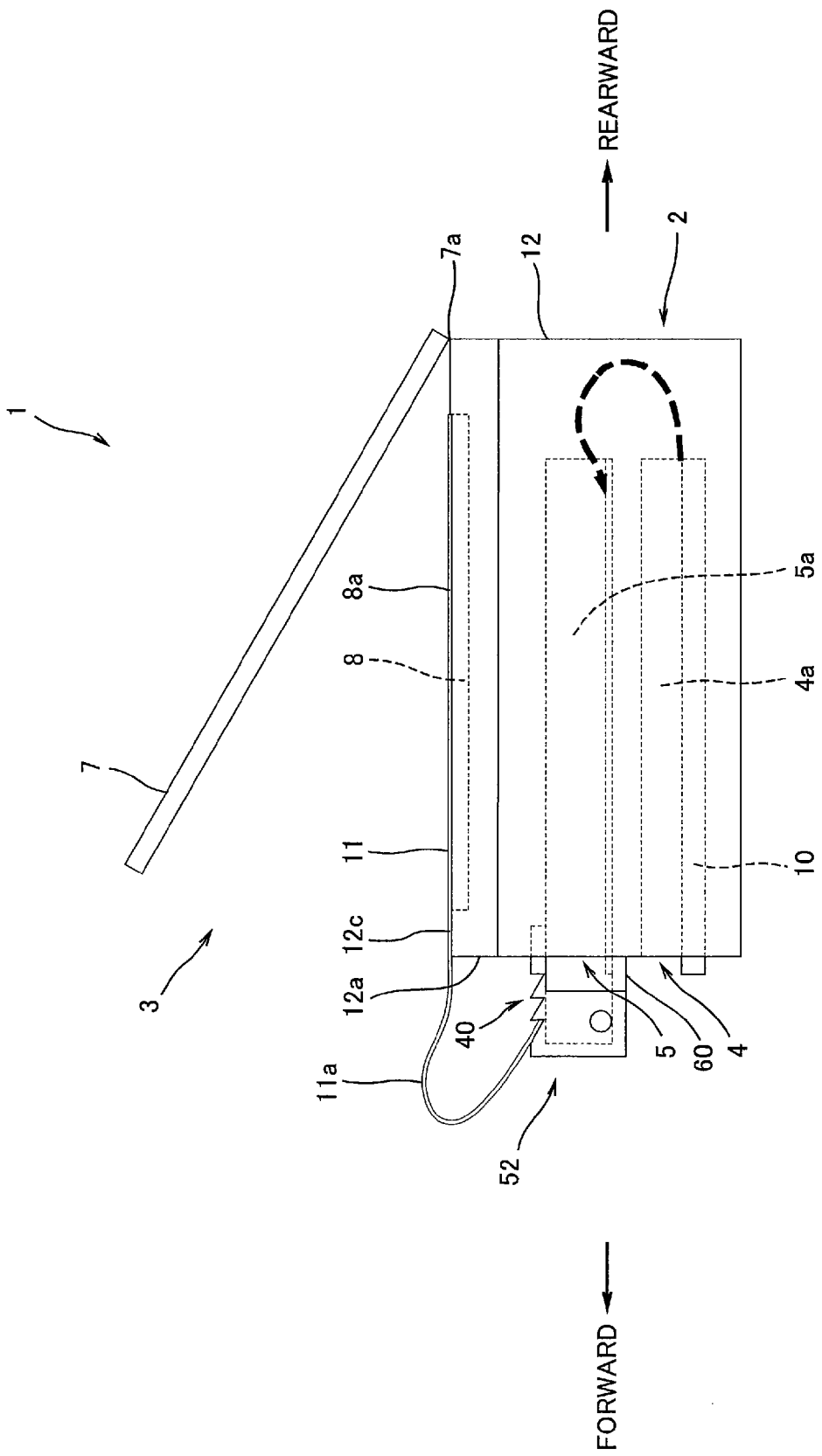
FIG. 9 is a side view showing a configuration of an image scanning apparatus equipped with an original sheet support portion according to an example 4.

FIG. 9 is a side view showing a configuration of the image scanning apparatus 1 comprising the original sheet support portion 40 according to an example 4. As shown in FIG. 9, a paper discharge cassette 60 of a box-shape is attached to the paper discharge tray 5a of the image scanning apparatus 1, and the original sheet support portion 40 is provided at a portion of the paper discharge cassette 60 which protrudes outward from the paper discharge outlet 5. The structure of the paper discharge cassette 60 is the same as that of the paper supply cassette 50 shown in FIG. 8, and will not be further described. In the state where the paper discharge cassette 60 is attached to the paper discharge tray 5a, the original sheet support portion 40 protrudes forward from the region in the vicinity of the upper end of the paper discharge outlet 5.

In the image scanning apparatus 1 comprising the original sheet support portion 40 according to the example 4, as in the image scanning apparatus 1 according to examples 1 to 3, the original sheet cover 7 can be easily closed while correctly positioning the original sheet 11 having a larger size than the platen surface 8a on the platen surface 8a. In addition, for the same reason described in the example 2, the end portion 11b of the protruding portion 11a of the original sheet 11 can be supported reliably.

EXAMPLE 5

Figure 10:
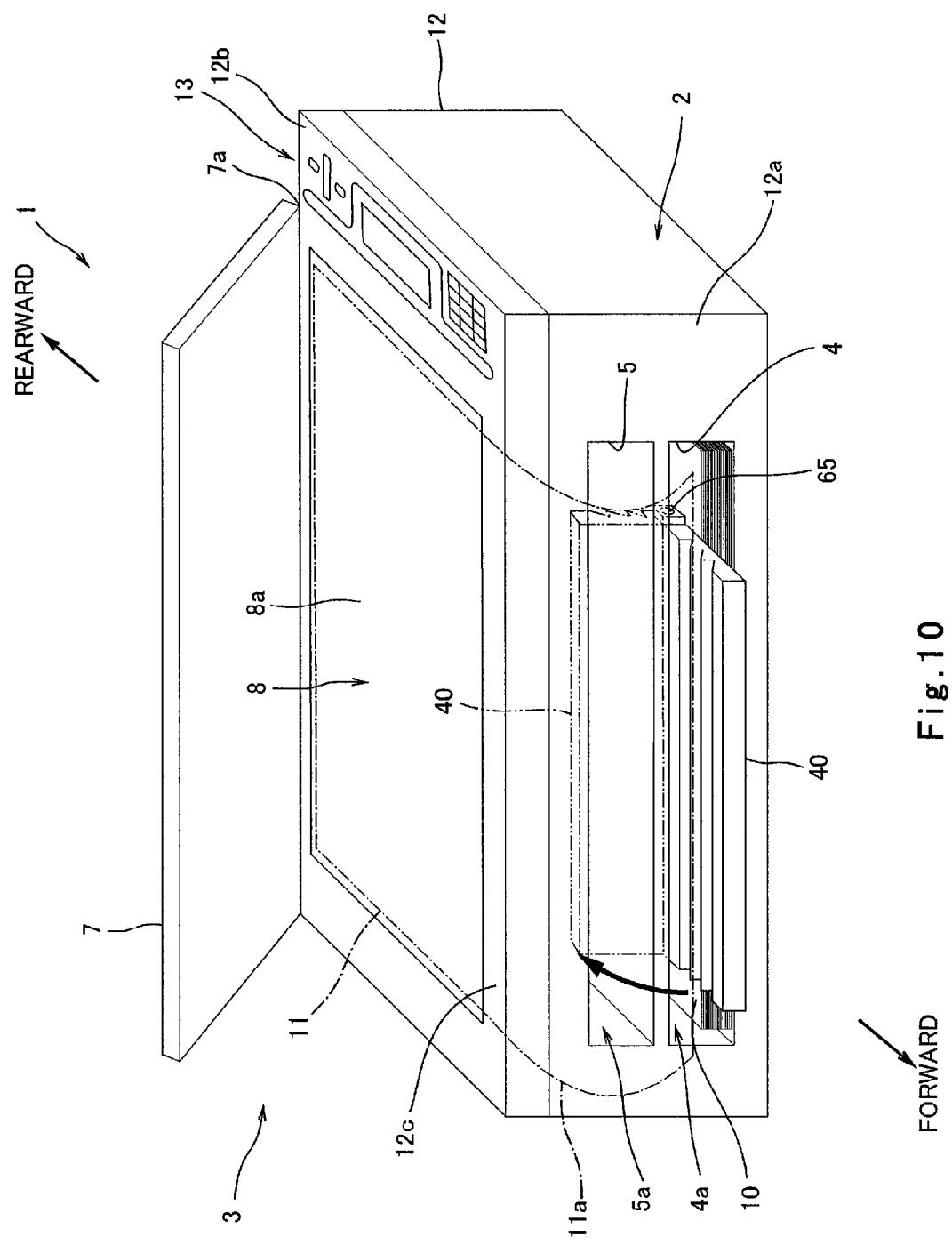
FIG. 10 is a perspective view showing a configuration of an image scanning apparatus equipped with an original sheet support portion according to an example 5.

FIG. 10 is a perspective view showing a configuration of the image scanning apparatus 1 comprising the original sheet support portion 40 according to an example 5. As shown in FIG. 10, the image scanning apparatus 1 has a configuration identical to that of the image scanning apparatus 1 according to the example 2 described with reference to FIGS. 5 and 6 except that the original sheet support portion 40 in the image scanning apparatus 1 of the example 5 is rotatable.

To be specific, as shown in FIG. 10, the original sheet support portion 40 is rotatable within a predetermined angular range around a pivot shaft 65 extending rightward and leftward at a region of the front wall portion 12a of the casing 12 between the paper supply inlet 4 and the paper discharge outlet 5. By rotating the original sheet support portion 40 forward, the original sheet support portion 40 protrudes forward from the region in the vicinity of a lower end of the paper discharge outlet 5 to open the paper discharge outlet 5, exposing the insertion grooves 45 on the upper surface thereof, as indicated by a solid line in FIG. 10. On the other hand, by rotating the original sheet support portion 40 rearward to rise up, it closes the paper discharge outlet 5 from forward as indicated by a two-dotted line in FIG. 10.

In the image scanning apparatus 1 comprising the original sheet support portion 40 according to the example 5, as in the image scanning apparatus 1 according to examples 1 to 4, the original sheet cover 7 can be easily closed while correctly positioning the original sheet 11 having a larger size than the platen surface 8a on the platen surface 8a in the state where the original sheet support portion 40 protrudes forward. In addition, for the same reason described in the example 2, the end portion 11b of the protruding portion 11a of the original sheet 11 can be supported reliably. On the other hand, by rotating the original sheet support portion 40 to rise up to close the paper discharge outlet 5, it becomes possible to prevent dust or foreign matters from entering the casing 12 from the paper discharge outlet 5. In addition, it becomes possible to suppress drying of the ink in the ejecting head 20 equipped in the printer section 2. Furthermore, since the original sheet support portion 40 is configured to be protruded forward as desired, and is caused to rise up in the other cases, the front-rear size of the image scanning apparatus 1 can be reduced.

Whereas in the example 5, the original paper support portion 40 in the image scanning apparatus 1 of the example 2 is configured to be rotatable, the original sheet support portion 40 in the image scanning apparatus 1 of the example 1 may be configured to be rotatable as well. In this case, the paper supply inlet 4 can be closed by rotating the original sheet support portion 40 rearward to rise up so that dust or foreign matters are prevented from entering an inside of the casing 12 through the paper supply inlet 4.

(Other Structures of Original Sheet Support Portion)

Figure 11A:
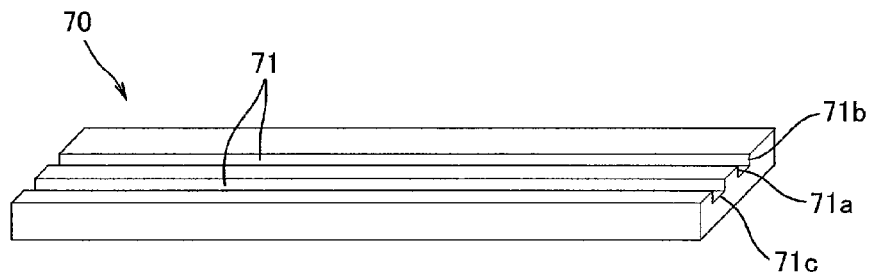
FIG. 11A is a perspective view showing an original sheet support portion having other structure, which is provided with insertion grooves on an upper surface thereof.
Figure 11B:
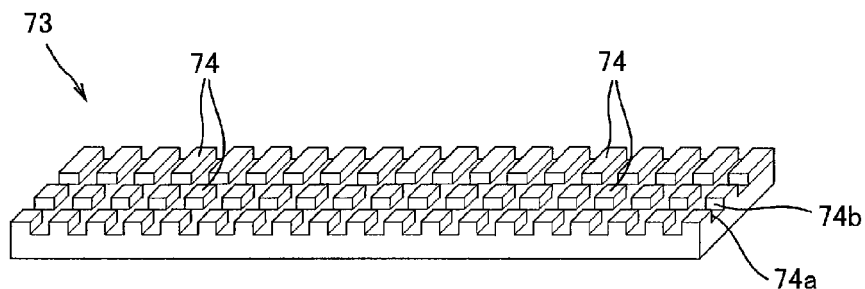
FIG. 11B is a perspective view showing an original sheet support portion having other structure, which is provided with protrusions on an entire upper surface thereof.
Figure 11C:
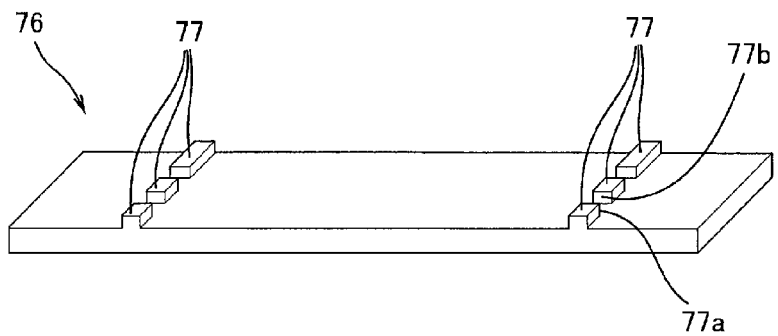
FIG. 11C is a perspective view showing an original sheet support portion having other structure, which is provided with protrusions on a part of an upper surface thereof.

Other structures of the original sheet support portion which replace the original sheet support portion 40 in the image scanning apparatus 1 according to the examples 1 to 5, will be described. FIG. 11A is a perspective view showing an original sheet support portion 70 having other structure, which is provided with insertion grooves 71 on an upper surface thereof. FIG. 11B is a perspective view showing an original sheet support portion 73 having other structure, which is provided with protrusions 74 on an entire upper surface thereof. FIG. 11C is a perspective view showing an original sheet support portion 76 having other structure, which is provided with protrusions 77 on a part of an upper surface thereof.

As shown in FIG. 11A, the original sheet support portion 70 has a rectangular plate shape elongated rightward and leftward, and is provided on the upper surface thereof with a plurality of, in this example, two insertion grooves 71 extending to right and left end surfaces thereof. Each insertion groove 71 has a rectangular shape in a side view, and is formed by a pair of front and rear support walls 71a and 71b arranged forward and rearward and a bottom wall 71c connecting lower portions of the support walls 71a and 71b.

As shown in FIG. 11B, the original sheet support portion 73 has a rectangular plate shape elongated rightward and leftward, and is provided on an entire upper surface thereof with a plurality of support protrusions 74 arranged forward and rearward and rightward and leftward in a matrix form. Each support protrusion 74 has a rectangular parallelepiped shape. Opposite surfaces of the support protrusions 74 arranged forward and rearward form a pair of support walls 74a and 74b.

As shown in FIG. 11C, the original sheet support portion 76 has a rectangular plate shape elongated rightward and leftward, and is provided on right and left sides of an upper surface thereof with a plurality of support protrusions 77 arranged forward and rearward. Each support protrusion 77 has a rectangular parallelepiped shape, and opposite surfaces of the support protrusions 77 arranged forward and rearward form a pair of support walls 77a and 77b.

The above described original sheet support portions 70, 73, and 76 are applicable to the image scanning apparatus 1 according to the examples 1 to 5. With the original sheet support portions 70, 73, and 76, the original sheet cover 7 can be easily closed while correctly positioning the original sheet 11 having a larger size than the platen surface 8a on the platen surface 8a as described above.

The structure of the original sheet support portion is not intended to be limited to the above, but may have other various forms so long as the end portion 11b of the protruding portion 11a of the original sheet 11 can be supported.

Whereas the original sheet support portion 40 is configured to protrude from the region in the vicinity of the lower end of the paper supply inlet 4 or from the region in the vicinity of the upper end of the paper supply inlet 4 (examples 1 and 3), or from the region in the vicinity of the lower end of the paper discharge outlet 5 or from the region in the vicinity of the upper end of the paper discharge outlet 5 (examples 2 and 4), other suitable configuration may be employed so long as the original sheet support portion 40 protrudes forward from the front wall portion 12 of the casing 12 in a position under the platen surface 8a. It is desirable to meet the relationship of (A+B)<2C.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image scanning apparatus comprising:
    a platen surface which is provided at an upper part of a main body of the image scanning apparatus so that an original sheet to be scanned is placed thereon; and
    an original sheet support portion which is provided to support an original sheet having a larger size than the platen surface;
    wherein the original sheet support portion is provided to protrude laterally from the main body from a position below the platen surface to be able to support an edge portion of a protruding portion of the original sheet protruding outside from the platen surface.

2. The image scanning apparatus according to claim 1,
    wherein the main body has, on a side surface thereof located below the platen surface, an opening of at least one of a paper supply inlet from which a recording sheet on which a scanned image is to be recorded is supplied to inside the main body and a paper discharge outlet from which the recording sheet having the scanned image recorded is discharged to outside the main body; and
    wherein the original sheet support portion protrudes from a region in the vicinity of a lower end of the opening.

3. The image scanning apparatus according to claim 2,
    wherein the original sheet support portion is movable between a state where the original sheet support portion protrudes from the region in the vicinity of the lower end of the opening to open the opening and a state where the original sheet support portion closes the opening.

4. The image scanning apparatus according to claim 1,
    wherein the original sheet support portion has an insertion portion into which an end portion of the protruding portion of the original sheet is inserted; and wherein the insertion portion has a pair of support portions extending substantially vertically to face an obverse surface and a reverse surface of the original sheet.

5. The image scanning apparatus according to claim 4,
    wherein the insertion portion is a part of a plurality of insertion portions arranged to extend in a direction perpendicular to a direction in which the edge portion of the protruding portion extends.

6. The image scanning apparatus according to claim 4,
    wherein the pair of support portions are located closer to and distant from the opening, respectively, and the support portion located closer to the opening is inclined with respect to a vertical direction with a larger angle than the support portion located distant from the opening; and
    wherein the pair of support portions are shaped such that a distance between the pair of support portions increases as the support portions extend upward.

7. The image scanning apparatus according to claim 1, wherein in the upper part of the main body, an upper surface of a surrounding region which surrounds the platen surface and is located closer to the original sheet support portion, is formed to be flat and substantially coplanar with the platen surface.

8. The image scanning apparatus according to claim 7, further comprising: an operation section which is provided at a surrounding region surrounding the platen surface other than the surrounding region located closer to the original sheet support portion.

* * * * *